(12) United States Patent
Cuypers et al.

(10) Patent No.: US 8,768,113 B2
(45) Date of Patent: Jul. 1, 2014

(54) MEASURING DEVICE FOR MEASUREMENT OF PARAMETERS IN MOLTEN MASSES

(75) Inventors: Jan Cuypers, Kermt (BE); Marc Straetemans, Eksel (BE); Valère Indeherberge, Zonhoven (BE); Maurice Houbregs, Genk (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 64 days.

(21) Appl. No.: 13/370,901

(22) Filed: Feb. 10, 2012

(65) Prior Publication Data

US 2012/0212728 A1 Aug. 23, 2012

(30) Foreign Application Priority Data

Feb. 23, 2011 (DE) .......................... 10 2011 012 174

(51) Int. Cl.
*G02B 6/00* (2006.01)
*G02B 6/255* (2006.01)
*G01K 11/00* (2006.01)

(52) U.S. Cl.
USPC ................. 385/12; 385/96; 385/135; 356/43; 374/139

(58) Field of Classification Search
USPC ........... 385/12, 27–28, 31–32, 39, 51, 88, 91, 385/94–99, 134–137; 374/4, 5, 26, 139, 14; 356/43
See application file for complete search history.

(56) References Cited

U.S. PATENT DOCUMENTS

| | | | |
|---|---|---|---|
| 4,752,094 A | 6/1988 | Tabeau | |
| 5,802,237 A | 9/1998 | Pulido | |
| 6,227,702 B1 | 5/2001 | Yamada et al. | |
| 7,197,199 B2 | 3/2007 | Cuypers et al. | |
| 7,307,409 B2 | 12/2007 | Dams | |
| 2002/0186437 A1* | 12/2002 | Sasaoka | 359/161 |
| 2006/0114967 A1* | 6/2006 | Dams et al. | 374/139 |
| 2011/0043898 A1* | 2/2011 | Grunsteidl et al. | 359/341.3 |

FOREIGN PATENT DOCUMENTS

| | | |
|---|---|---|
| DE | 103 31 125 B3 | 9/2004 |
| EP | 0222662 A1 | 5/1987 |
| EP | 0802401 A1 | 10/1997 |
| EP | 0903594 A1 | 3/1999 |
| EP | 1377862 B1 | 9/2005 |

(Continued)

OTHER PUBLICATIONS

Search Report and Written Opinion issued Jan. 9, 2012 in BE Application No. 201100432.
Search Report issued Jul. 31, 2012 in EP Application No. 12000511.1.
Office Action issued Dec. 20, 2011 in DE Application No. 102011012174.9.

*Primary Examiner* — Uyen Chau N Le
*Assistant Examiner* — Michael Mooney
(74) *Attorney, Agent, or Firm* — Panitch Schwarze Belisario & Nadel LLP

(57) ABSTRACT

A measuring device is provided for measurement of parameters, in particular for measuring the temperature, in molten masses, in particular in molten metal or molten cryolite masses having a melting point above 500° C. The measuring device has an optical fiber for receiving radiation from the molten mass and a cable reel having an external circumference for winding up the optical fiber and an internal space surrounded by the external circumference. A distributor and a mode filter for the optical fiber are arranged in the internal space.

21 Claims, 2 Drawing Sheets

(56) References Cited

FOREIGN PATENT DOCUMENTS

| EP | 1617194 | A1 | 1/2006 |
|---|---|---|---|
| JP | 63-214627 | A | 9/1988 |
| WO | 0169313 | A1 | 9/2001 |
| WO | 2005005945 | A1 | 1/2005 |
| WO | 2008017622 | A1 | 2/2008 |
| WO | 2010001156 | A1 | 1/2010 |
| WO | 2010015846 | A1 | 2/2010 |

* cited by examiner

MEASURING DEVICE FOR MEASUREMENT OF PARAMETERS IN MOLTEN MASSES

BACKGROUND OF THE INVENTION

The invention relates to a measuring device for measurement of parameters, in particular for measuring the temperature, in molten masses, in particular in molten metal or molten cryolite masses having a melting point above 500° C. The device comprises an optical fiber for receiving radiation from the molten mass and a cable reel having an external circumference for winding up the optical fiber and an internal space surrounded by the external circumference. The invention further relates to a cable reel suitable for use in the measuring device according to the invention.

Similar measuring devices are known, for example, from U.S. Pat. No. 6,227,702 B1 and German Patent DE 103 31 125 B3. Here, an optical fiber is used for measuring in molten masses, wherein the optical fiber is connected, on the one hand, to a measuring device and, on the other hand, to an immersion lance for immersion into the molten mass. The optical fiber is fed in through a feeding mechanism of the immersion lance and is guided, in a trailing manner, according to its consumption, wherein it is unwound from a type of cable reel. The measuring process is sufficiently well-known from the two patents cited above.

Regarding the relatively long optical fibers (up to several hundred meters) used, it has been evident that the fiber receives the radiation at its immersion end with a multitude of so-called modes, also called vibrational modes. The various modes are attenuated to different intensities along the extensive length of the fiber and are optionally modified by mutual interference. The process of attenuation, and thus of signal modification, is a function of the path length travelled by the light signal through the optical fiber. Overall, this may corrupt, for example, a temperature measuring signal of approx. 1,600° C. by distinctly more than 10° C. upon a change of the length of the optical fiber of approx. 100 meters, owing to it being consumed during the process. In order to keep the corruption effect as small as possible during multiple measurements, it is customary to keep a substantial length of optical fiber on the cable reel and not consume it, although this is expensive.

So-called mode filters, in which specific reduction of the diameter of an optical fiber in certain places eliminates modes, are known from the telecommunications industry. This can be done without difficulty in telecommunications, since the length of the fibers is relatively constant (the fibers are not being consumed) and the light is coupled into the so-called core of the optical fiber and not into its jacket. Like the core, the jacket consists of quartz glass. The length of the fibers used in telecommunications usually is distinctly more than one kilometer; modes in the jacket are deleted over such distances and have no interfering effect.

In metallurgy, in particular for measurements, substantially shorter optical fibers are used, usually less than 500 meters, wherein the light is coupled into both the core and into the jacket of the optical fiber and is very unstable as a result. The optical fiber being exposed to strongly varying temperature during its use can also impair the stability.

BRIEF SUMMARY OF THE INVENTION

It is an object of the present invention to improve on the existing measuring devices and enable more exact measurements to be made.

The object is achieved by the present invention in that the measuring device described at the outset is characterized by a distributor and a mode filter for the optical fiber being arranged in the internal space of the cable reel. As a result, essential components for beam guidance are combined in a relatively small space, and the interfering modes are filtered out, such that the measuring accuracy in molten masses is improved, even if the length of the optical fiber changes substantially. Accordingly, for example in molten masses at a temperature of approx. 1,600° C., the accuracy of the measurement and the reproducibility of the measurement in the course of the quartz glass fiber being consumed are improved to a deviation of less than 10° C.

The optical fiber comprises a core and a jacket, both being made of quartz glass, as well as a sheath surrounding the quartz glass. The sheath can be made of metal, such as steel, at least in the section intended to be consumed, and stabilizes the quartz glass mechanically. The sheath may just as well be made of a plastic material in a section that cannot be consumed.

A distributor is also known by the term of "organizer". It serves not only for compensation of a length deviation, if any, of different lengths of the optical fiber exchanged after being consumed, but also for connecting the consumable part of the optical fiber to another section of an optical fiber, not intended to be consumed, via an optical fiber connection, also called "splice," wherein the optical fiber not intended to be consumed can be provided for coupling to a signal transducer or an electronics unit.

Connectors or organizers of this type are known in telecommunications, for example from U.S. Pat. No. 5,802,237 or, in different structural form, from European Patent EP 1 377 862 B1. Further organizers of this type used in telecommunications are known from European patent application publications EP 0 222 662 A1 and EP 0 903 594 A1 and from International patent application publications WO 2010/015846 A1, WO 2010/001156 A1 or WO 2008/017622 A1. However, these are intended for stationary operation and for non-consumable optical fibers, whereas the measuring device according to the invention, according to its type, is intended for consumption of the optical fiber used therein. For this reason, it is advantageous if the cable reel is arranged on a carrier of the measuring device, i.e., arranged very generally on a bracket, in a manner such that it can be rotated.

The carrier can be provided as a frame and/or can be provided with a housing, which can serve to hold individual components of the measuring device. The cable reel can be arranged either inside or outside the housing. A rotatable wheel or a rotatable bracket, to which the cable reel is fixed and by which the cable reel can be connected to the carrier, can be provided on the carrier. The carrier can preferably be constructed to be mobile, such that the measuring device can be transported according to need. For this purpose, wheels or a handle, for example, can be provided. The cable reel can be arranged in a housing which comprises further control elements and/or electronic components.

A holder may be provided on the carrier, such that the immersion lance used for measurements can be fixed on the holder during the pauses between measurements. It is advantageous for the carrier to comprise a feed facility for the optical fiber and, optionally, an instrument panel that serves for operation or control of the fiber feed and of the measuring device as such. A display can be integrated into the instrument panel for this purpose.

The cable reel is expediently arranged on the carrier, so as to be detachable in order to ensure rapid replacement thereof, including replacement after consumption of the optical fiber.

It is preferable to arrange a detector and/or data storage unit and/or signal transducer facility and/or an electrical interface in the internal space of the cable reel. The detector and the signal transducer facility serve for receiving the optical signal and converting the light received into electrical signals. The data storage unit serves, for example, for storage of the consumption of the optical fiber, and the electrical interface enables further connection of the measuring device to laboratory facilities, computers or the like. The detector can expediently be arranged inside a housing of the signal transducer facility connecting the optical fiber to an electrical cable. The common housing makes shielding against external influences possible, such that optical as well as electrical or electromagnetic and mechanical influences can be prevented.

Moreover, it is advantageous if an optical fiber connector, a so-called splicer, is arranged in the internal space of the cable reel. This is used to connect fibers of different types, for example the optical fiber used for measurements, which is provided with a metal sheath and extends from an immersion lance, which may be used, via the multiple turns of the reel on the external circumference of the cable reel into the internal space thereof, and which is connected therein to a further optical fiber, which may be provided, for example, with just a plastic sheath. The optical fiber, which is preferably sheathed by plastic material, is then connected, for example, to the detector in the housing of a signal transducer facility. It is therefore advantageous if two optical fibers are connected via splicing in the internal space, wherein the splicing preferably comprises a welded connection.

The mode filter expediently comprises an arrangement of a section of the optical fiber that extends on a closed curve, in particular on a circular path. The optical fiber expediently extends, in particular, in 1-20 turns of a coil on the closed curve. The closed curve expediently has a minimum diameter of 1 cm-6 cm. A mode filter of this type, which, in principle, can be provided as a suitably small cable reel, eliminates interfering modes, in particular in the region of the fiber sheath of the optical fiber. It is advantageous if the mode filter is surrounded at its circumference by the distributor (organizer), i.e. is arranged inside the distributor. Moreover, it is expedient if the internal space of the cable reel is mechanically and/or electromagnetically sealed.

It is expedient if a detector, an end of an optical fiber connected to the detector, and a band-pass filter are connected to each other in a non-detachable manner in the measuring device, in particular in the housing of the carrier, and preferably are sealed against moisture and stray light. In addition or alternatively, it can be expedient if a core of an optical fiber, which is connected to a detector on one side and to the optical fiber wound onto the cable reel on the other side, preferably has, on its end connected to the detector, an equal sized or smaller diameter than the optical fiber wound onto the cable reel. An arrangement of this type also represents a mode filter.

Moreover, an antenna for wireless signal transmission can be arranged on the measuring device in order to increase the flexibility of use of the measuring device.

Further, the scope of the invention also includes a cable reel for use in a measuring device according to the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
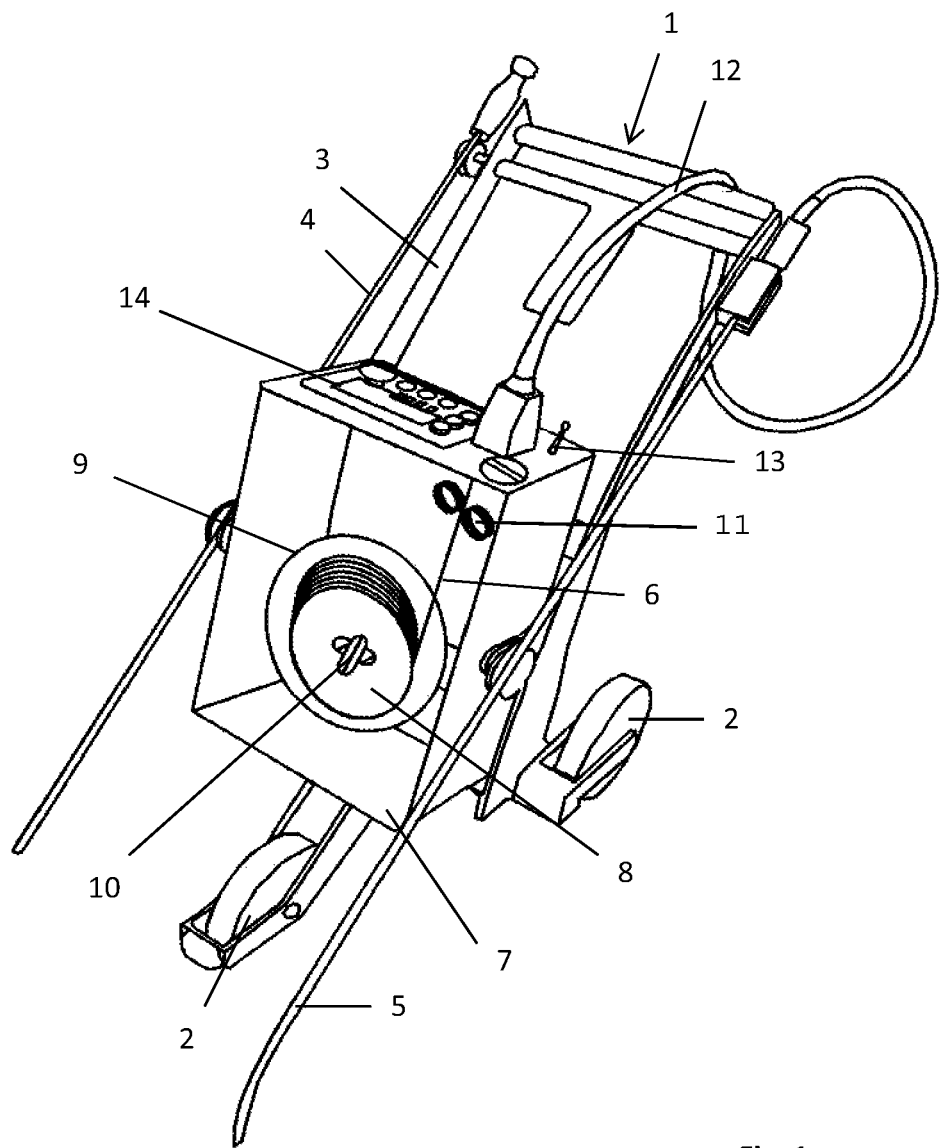
FIG. 1 is an overall schematic perspective view of a measuring device according to an embodiment of the invention.

FIG. 1 shows an exemplary embodiment of a measuring device according to the invention. It comprises a mobile carrier 1 provided with wheels 2, so as to be capable of driving. A so-called crust breaker 4 can be fixed in place on a frame 3 of the carrier 1 and can be used to break through a slag present on molten metal, for example on molten steel, in order to allow the immersion lance 5, which is also bracketed on the carrier 1 and through which an optical fiber 6 extends, to be guided into the molten mass. Once in place, radiation is received in the optical fiber 6 for the measurement, and the temperature of the molten mass can be determined from the radiation in a known manner.

The carrier 1 comprises a housing 7 closed on all sides and has a cable reel 8 arranged in detachable manner on a rotatable wheel 9 inside the housing. The cable reel 8 is fixed in place on the rotatable wheel 9 by a bracket 10 in detachable manner. Moreover, besides the cable reel 8, at least a fiber feed mechanism 11 is arranged inside the closed housing 7 and can be used to feed, in trailing manner, the optical fiber 6 from the rotatable cable reel 8 through a protective sheath 12 into the immersion lance 5, either continuously or according to need. Next to the exit of the protective sheath 12, an antenna 13 for wireless transmission of data is arranged on the top of the housing 7. Moreover, an instrument panel 14 with a display is situated on top of the housing 7.

Figure 2:
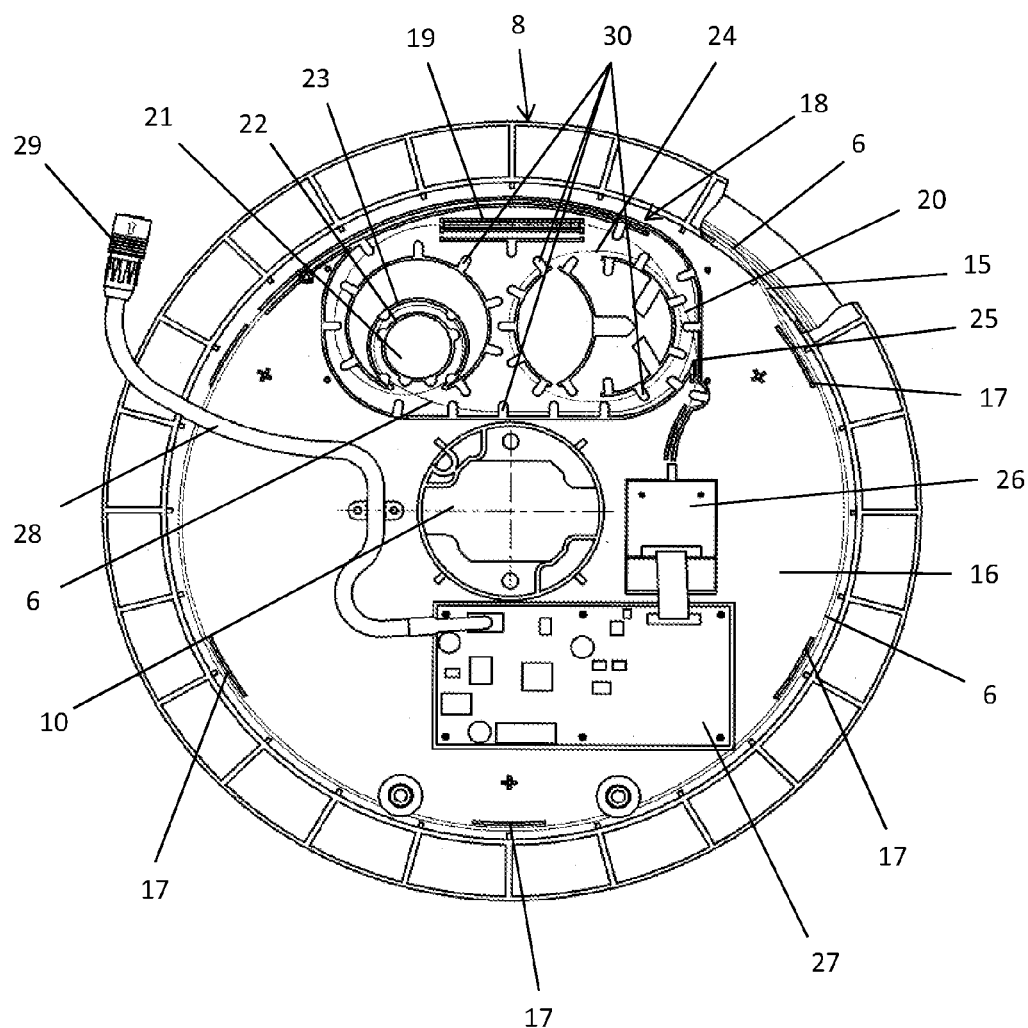
FIG. 2 is a schematic side view showing the internal space of a cable reel according to an embodiment of the invention.

FIG. 2 shows the internal space of the cable reel 8. The bracket 10 can be seen in the center and serves to fix the cable reel 8 in place on the carrier 1 inside the housing 7. The optical fiber 6 is wound about the external circumference of the cable reel 8. The optical fiber 6 is made of quartz glass jacketed by a steel tube. Inside the steel tube the optical fiber 6 comprises a core made of quartz glass and a jacket also made of quartz glass. An end of the optical fiber 6 is guided though an opening 15 in the external jacket surface of the cable reel 8 into the internal space 16 of the cable reel 8, where it is guided further through guiding rails 17 along the internal circumferential surface of the cable reel 8 into the distributor 18. In the distributor 18 different guiding elements 30, which are arranged in the distributor, guide the optical fiber 6 through the mode filter 21 into an optical fiber connector 19, a so-called splicer. One end of the optical fiber 6 is welded to another optical fiber 20 in this splicer.

The mode filter 21 comprises a circular spool 22 largely surrounded by a guide 23, wherein the optical fiber 6 is wound about the spool 22 in approximately five turns in a gap between the guide 23 and the spool 22. The turns of the optical fiber 6 thus formed have a diameter of approximately 4 to 5 cm, such that interfering modes are eliminated by the small diameter.

The optical fiber 20 comprises a core and a jacket made of quartz glass arranged over the core. Optionally, the optical fiber 20 is guided in a loop inside the distributor 18 by various guiding elements 30 to the exit 25 of the distributor 18 and extends from there into a detector 26. The two optical fibers 6, 20 are guided in different planes by the guiding elements 30, such that they do not contact each other.

The detector 26 is sealed with respect to electromagnetic radiation and stray light. It is connected to a printed circuit board 27, which contains a memory unit among other units, in which data concerning cable consumption, temperatures measured, and the like can be stored. The printed circuit board 27 has a cable 28 arranged thereon, which comprises a coupling 29 for passing-on electrical signals to downstream devices as, for example, computers.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A measuring device for measurement of parameters in a molten mass, including a molten metal or molten cryolite mass having a melting point above 500° C., the measuring device comprising an optical fiber for receiving radiation from the molten mass, a cable reel having an external circumference for winding up the optical fiber and an internal space surrounded by the external circumference, and a distributor and a mode filter for the optical fiber, the distributor and the mode filter being arranged in the internal space.

2. The measuring device according to claim 1, wherein the cable reel is arranged on a carrier so as to be rotatable.

3. The measuring device according to claim 2, wherein the carrier comprises a feed facility for the optical fiber.

4. The measuring device according to claim 2, wherein the carrier comprises an instrument panel.

5. The measuring device according to claim 2, wherein the cable reel is arranged on the carrier in detachable manner.

6. The measuring device according to claim 1, wherein the internal space of the cable reel has at least one of a detector, a data storage unit, a signal transducer facility, and an electrical interface.

7. The measuring device according to claim 6, wherein the detector is arranged inside a housing of the signal transducer facility which connects the optical fiber to an electrical cable.

8. The measuring device according to claim 1, wherein the internal space contains a splicer for connecting optical fibers.

9. The measuring device according to claim 8, wherein two optical fibers are connected by splicing in the internal space, wherein the splicing is a welded connection.

10. The measuring device according to claim 1, wherein the mode filter comprises an arrangement of a section of the optical fiber extending on a closed curve.

11. The measuring device according to claim 10, wherein the section of the optical fiber extends on a circular path.

12. The measuring device according to claim 10, wherein the optical fiber extends in 1 to 20 turns of a coil on the closed curve.

13. The measuring device according to claim 10, wherein a smallest diameter of the closed curve is 1 cm to 6 cm.

14. The measuring device according to claim 10, wherein a circumference of the mode filter is surrounded by the distributor.

15. The measuring device according to claim 1, wherein the internal space of the cable reel is mechanically and/or electromagnetically sealed.

16. The measuring device according to claim 1, wherein a detector, an end of an optical fiber connected to the detector, and a band-pass filter are connected to each other in a non-detachable manner.

17. The measuring device according to claim 16, wherein the connection of the detector, the end of the optical fiber connected to the detector, and the band-pass filter are sealed against moisture and stray light.

18. The measuring device according to claim 16, wherein a core of the optical fiber connected to the detector on one side and to the optical fiber wound onto the cable reel on the other side has on its end connected to the detector a diameter no greater than a diameter of the optical fiber wound onto the cable reel.

19. The measuring device according to claim 1, wherein an antenna for wireless signal transmission is arranged on the measuring device.

20. The measuring device according to claim 1, wherein the measuring device measures temperature in the molten mass.

21. A cable reel for use in a measuring device for measurement of parameters in a molten mass, including a molten metal or molten cryolite mass having a melting point above 500° C., the cable reel having an external circumference for winding up an optical fiber for receiving radiation from the molten mass, an internal space surrounded by the external circumference, and a distributor and a mode filter for the optical fiber, the distributor and the mode filter being arranged in the internal space.

* * * * *